(12) United States Patent
Jeong et al.

(10) Patent No.: US 11,876,163 B2
(45) Date of Patent: Jan. 16, 2024

(54) SIZING ROLLER APPARATUS FOR FOLDING PROCESS OF BATTERY CELL

(71) Applicant: CLEVER CO., LTD., Chungcheongbuk-do (KR)

(72) Inventors: Jong Hong Jeong, Chungcheongbuk-do (KR); Sang Jin Kim, Daejeon (KR)

(73) Assignee: CLEVER CO., LTD., Chungcheongbuk-do (KR)

( * ) Notice: Subject to any disclaimer, the term of this patent is extended or adjusted under 35 U.S.C. 154(b) by 275 days.

(21) Appl. No.: 17/426,691

(22) PCT Filed: Apr. 2, 2021

(86) PCT No.: PCT/KR2021/004171
§ 371 (c)(1),
(2) Date: Jul. 29, 2021

(87) PCT Pub. No.: WO2021/201656
PCT Pub. Date: Oct. 7, 2021

(65) Prior Publication Data
US 2022/0320565 A1    Oct. 6, 2022

(30) Foreign Application Priority Data
Apr. 3, 2020  (KR) .......................... 10-2020-0041218

(51) Int. Cl.
*H01M 10/04*    (2006.01)
*B29C 35/16*    (2006.01)
(Continued)

(52) U.S. Cl.
CPC ......... *H01M 10/0404* (2013.01); *B29C 35/16* (2013.01); *B29C 53/043* (2013.01); *B29C 53/063* (2013.01); *B29C 53/845* (2013.01); *H01M 10/0481* (2013.01); *B29C 2035/1666* (2013.01); *B29L 2031/3468* (2013.01); *B29L 2031/7146* (2013.01)

(58) Field of Classification Search
CPC ................................................. H01M 10/0404
See application file for complete search history.

(56) References Cited

U.S. PATENT DOCUMENTS 11,695,177 B2 *  7/2023  Kim .................... H01M 50/105
                                                    429/163

FOREIGN PATENT DOCUMENTS

KR        10-0912211 B1    8/2009
KR    10-2017-0053011 A    5/2017
(Continued)

OTHER PUBLICATIONS

International Search Report from corresponding PCT Application No. PCT/KR2021/004171, dated Jul. 5, 2021.

*Primary Examiner* — Jeffry H Aftergut
(74) *Attorney, Agent, or Firm* — Harness, Dickey & Pierce, P.L.C.

(57) ABSTRACT

A disclosed sizing roller apparatus for a folding process of a battery cell includes: a table fixing and supporting a battery cell; a base plate disposed on a side of the table; a plurality of sizing rollers disposed on the base plate and each having a rotation axis, which is inclined inward toward a folding portion of the battery cell, to press the folding portion of the battery cell in contact with the folding portion; and a plurality of air spray nozzles disposed on the base plate and spraying air to the plurality of sizing rollers.

7 Claims, 6 Drawing Sheets

(51) Int. Cl.
    *B29C 53/04*    (2006.01)
    *B29C 53/06*    (2006.01)
    *B29C 53/84*    (2006.01)
    *B29L 31/34*    (2006.01)
    *B29L 31/00*    (2006.01)

(56) References Cited

FOREIGN PATENT DOCUMENTS

| | | |
|---|---|---|
| KR | 10-1766966 B1 | 8/2017 |
| KR | 10-1958882 B1 | 3/2019 |
| KR | 10-1974443 B1 | 5/2019 |

* cited by examiner

SIZING ROLLER APPARATUS FOR FOLDING PROCESS OF BATTERY CELL

CROSS-REFERENCE TO RELATED APPLICATIONS

This application is a national phase application of PCT Application No. PCT/KR2021/004171, filed on Apr. 2, 2021, which claims the benefit and priority to Korean Patent Application No. 10-2020-0041218, filed on Apr. 3, 2020. The entire disclosures of the applications identified in this paragraph are incorporated herein by references.

TECHNICAL FIELD

The present disclosure relates to a sizing roller apparatus for a folding process of a battery cell, the sizing roller apparatus being able to improve a folding quality of a battery cell by suppressing spring back by cooling a plurality of sizing rollers in an air spray type while pressing a folding portion after folding the battery cell.

BACKGROUND ART

This section provides background information related to the present disclosure which is not necessarily prior art.

A battery cell has a main room region in which an electrode assembly formed by stacking a cathode plate, a separator, and an anode plate, is accommodated in a pouch, and formed in an oblong shape, and a sealing region (terrace) formed by sealing the edge of the pouch.

The sealing region prevents dielectric breakdown and is folded several times to minimize the size of a secondary battery cell, which is called a folding portion.

It is possible to form the folding portion described above by bending the sealing region at 90 degrees, 180 degrees, 270 degrees, etc. using a plurality of folding units. Such a folding portion of a battery cell is folded several times through a plurality of folding processes and the resultant folded shape is pressed and formed by a hot press at about 190 degrees and then discharged at a high temperature. However, since the state formed at a high temperature of 190 degrees is not a permanently formed state, there is a problem that spring back of returning to the initial state occurs.

In order to solve this problem, it is possible to prevent spring back by pressing the folding portion folded in the thickness direction of a battery cell using a plurality of sizing rollers.

However, when the folding portion of a battery cell keeps pressed with the plurality of sizing rollers in contact with the folding portion, the plurality of sizing rollers is heated, so there is a problem that the sizing effect on the folding portion of the battery cell is considerably decreased.

Sizing rollers may be arranged to be long (that is, several sizing rollers may be provided) to solve this problem. However, in this case, not only the installation cost is high, but there is limitation in preventing the sizing rollers from being heated except for a difference of time. Accordingly, there is a problem that the speed of the folding process (tack time) decreases.

Further, as for a long-width cell having a large cell length and recently spotlighted, many sizing rollers are needed, so there is a problem that the installation cost is high in this case too.

SUMMARY

Technical Problem

An object of the present disclosure is to provide a sizing roller apparatus for a folding process of a battery cell, the sizing roller apparatus being able to improve a folding quality of a battery cell by suppressing spring back by cooling a plurality of sizing rollers in an air spray type while pressing a folded portion after folding the battery cell.

Another object of the present disclosure is to provide a sizing roller apparatus for a folding process of a battery cell, the sizing roller apparatus being able to remarkably improve a sizing effect because it is possible to quickly decrease the temperature of a plurality of sizing rollers by spraying air into the spaces between the rollers while pressing a folding portion inward at an angle using the plurality of sizing rollers when a battery cell is conveyed after the sealing region of the battery cell is folded and pressed.

Another object of the present disclosure is to provide a sizing roller apparatus for a folding process of a battery cell, the sizing roller apparatus being able to make it possible to reduce the number of sizing rollers, keep the speed of a folding process due to an effect of cooling sizing rollers, and considerably improve a folding quality of a battery cell by preventing spring back of the folding portion of the battery cell only by having simple air spray nozzles after a folding and pressing step of a plurality of stations for a folding process of the battery cell.

Technical Solution

This section provides a general summary of the disclosure and is not a comprehensive disclosure of its full scope or all its features.

In order to solve the problems, a disclosed sizing roller apparatus for a folding process of a battery cell according to one of several aspects describing the present disclosure includes: a table fixing and supporting a battery cell; a base plate disposed on a side of the table; a plurality of sizing rollers disposed on the base plate and each having a rotation axis, which is inclined inward toward a folding portion of the battery cell, to press the folding portion of the battery cell in contact with the folding portion; and a plurality of air spray nozzles disposed on the base plate and spraying air to the plurality of sizing rollers.

In the sizing roller apparatus for a folding process of a battery cell according to one of several aspects describing the present disclosure, the base plate may be horizontally disposed to be able to move inward with respect to the table and move in the longitudinal direction of the table.

In the sizing roller apparatus for a folding process of a battery cell according to one of several aspects describing the present disclosure, the plurality of air spray nozzles may spray air to spaces between the plurality of sizing rollers.

In the sizing roller apparatus for a folding process of a battery cell according to one of several aspects describing the present disclosure, the table may have: a straight bar disposed in parallel with a process direction, vacuum-holding and supporting both sides of the bottom of the battery cell in the process direction, and arranged in two lines; and a conveying bar disposed between the straight bars, vacuum-holding the battery cell under the battery cell, and conveying the battery cell.

In the sizing roller apparatus for a folding process of a battery cell according to one of several aspects describing the present disclosure, the battery cell may be fixed and held on the table and pressed while the plurality of sizing rollers are moved.

In the sizing roller apparatus for a folding process of a battery cell according to one of several aspects describing the present disclosure, the battery cell may be pressed by the plurality of sizing rollers while being moved by the conveying bar.

In the sizing roller apparatus for a folding process of a battery cell according to one of several aspects describing the present disclosure, the sizing roller apparatus may include: end supports disposed at the front end and the rear end of the base plate, respectively, in the longitudinal direction of the table, extending upward; and an air supply pipe coupled to the tops of the end supports to supply air, in which the plurality of air spray nozzles may communicate with the air supply pipe and spray air to the plurality of sizing rollers.

Advantageous Effects

According to the present disclosure, it is possible to suppress spring back and improve the folding quality of a battery cell by cooling the plurality of sizing rollers in an air spray type while pressing a folding portion after a process of folding the battery cell.

Further, according to the present disclosure, when a battery cell is conveyed after a sealing region of the battery cell is folded and pressed, air is sprayed to spaces between a plurality of sizing rollers while a folding portion is pressed inward at an angle by the sizing rollers, whereby the temperature of the plurality of sizing rollers can be quickly decreased, and accordingly, the sizing effect can be remarkably improved.

Further, it is possible to reduce the number of sizing rollers, keep the speed of a folding process due to an effect of cooling sizing rollers, and considerably improve a folding quality of a battery cell by preventing spring back of the folding portion of the battery cell only by adding simple air spray nozzles after a folding and pressing step of a plurality of stations for a folding process of the battery cell.

DETAILED DESCRIPTION

Hereafter, embodiments of a sizing roller apparatus for a folding process of a battery cell according to an embodiment of the present disclosure are described in detail with reference to the drawings.

However, it should be noted that the intrinsic spirit of the present disclosure should not be construed as being limited to embodiments to be described hereafter and includes a range easily proposed by replacing or changing embodiments to be described below by those skilled in the art on the basis of the intrinsic spirit of the present disclosure.

Further, the terms to be used hereafter are selected for the convenience of description and should be appropriately construed as meanings coinciding with the intrinsic spirit of the present disclosure, not being limited to the meanings in dictionaries when finding out the spirit of the present disclosure.

Figure 1:
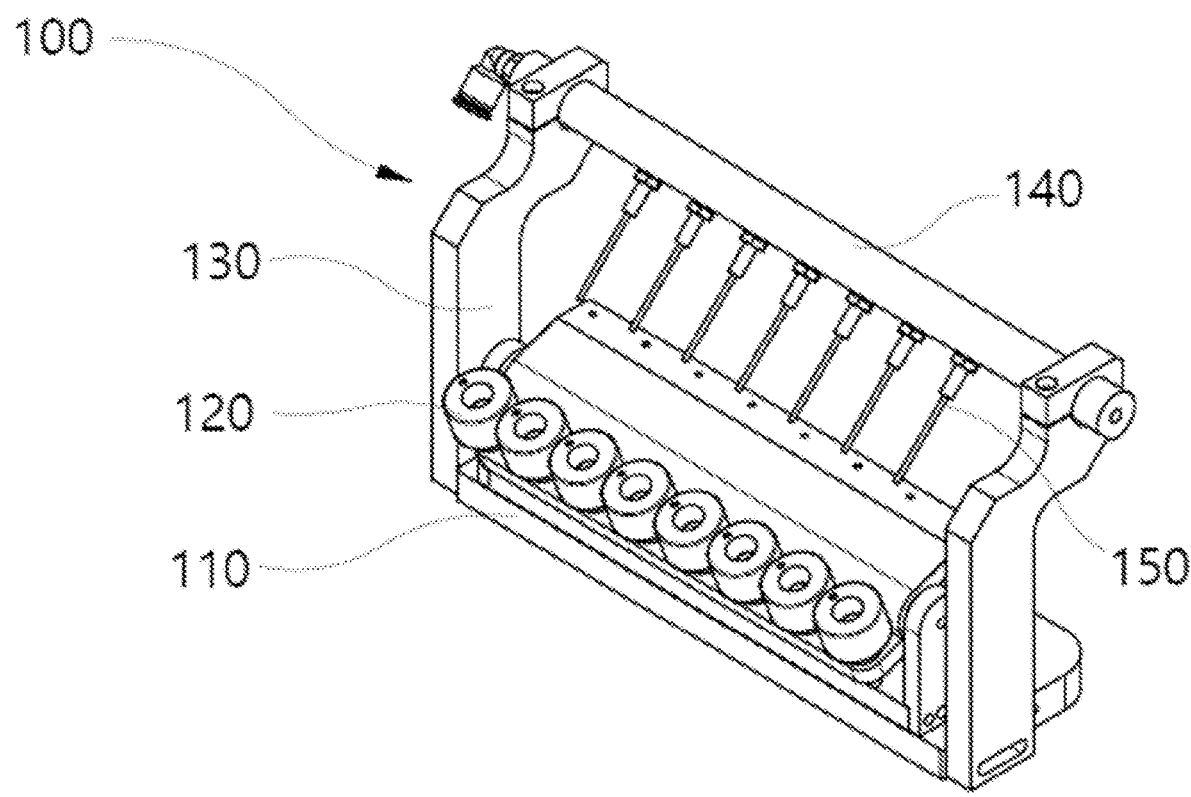
FIG. 1 is a perspective view exemplarily showing a sizing roller apparatus for a folding process of a battery cell according to an embodiment of the present disclosure.
Figure 2:
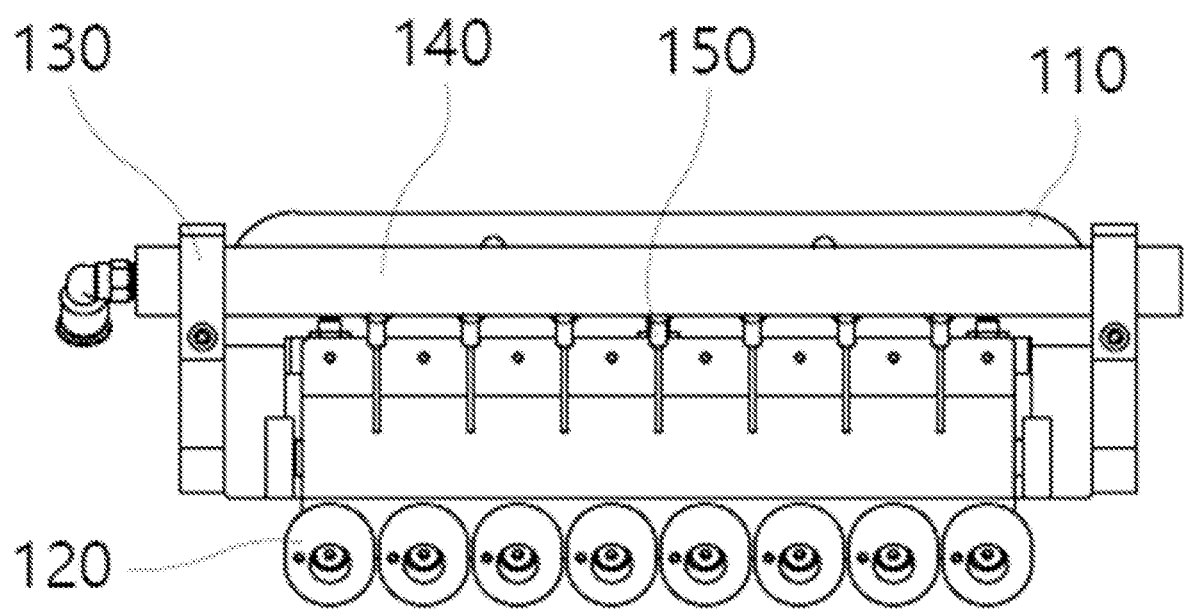
FIGS. 2, 3 and 4 are views illustrating the sizing roller apparatus for a folding process of a battery cell according to an embodiment of the present disclosure.
Figure 3:
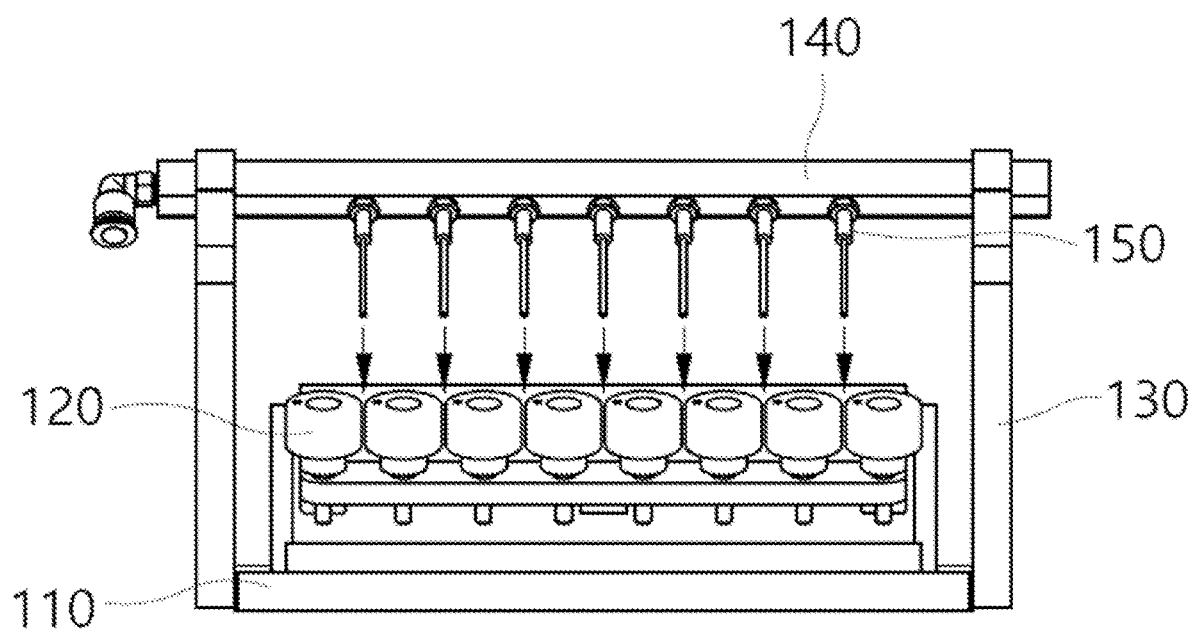
Figure 4:
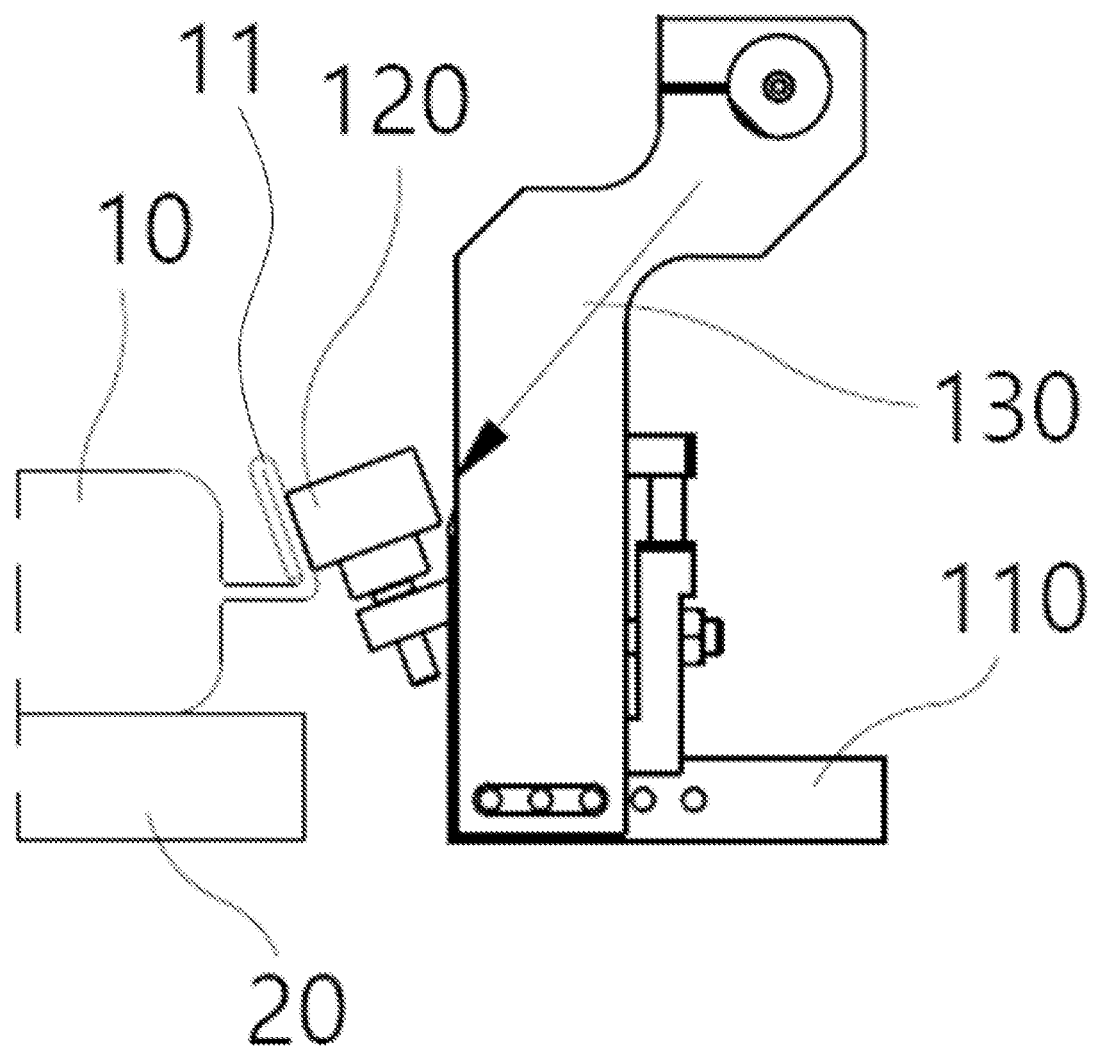
Figure 5:
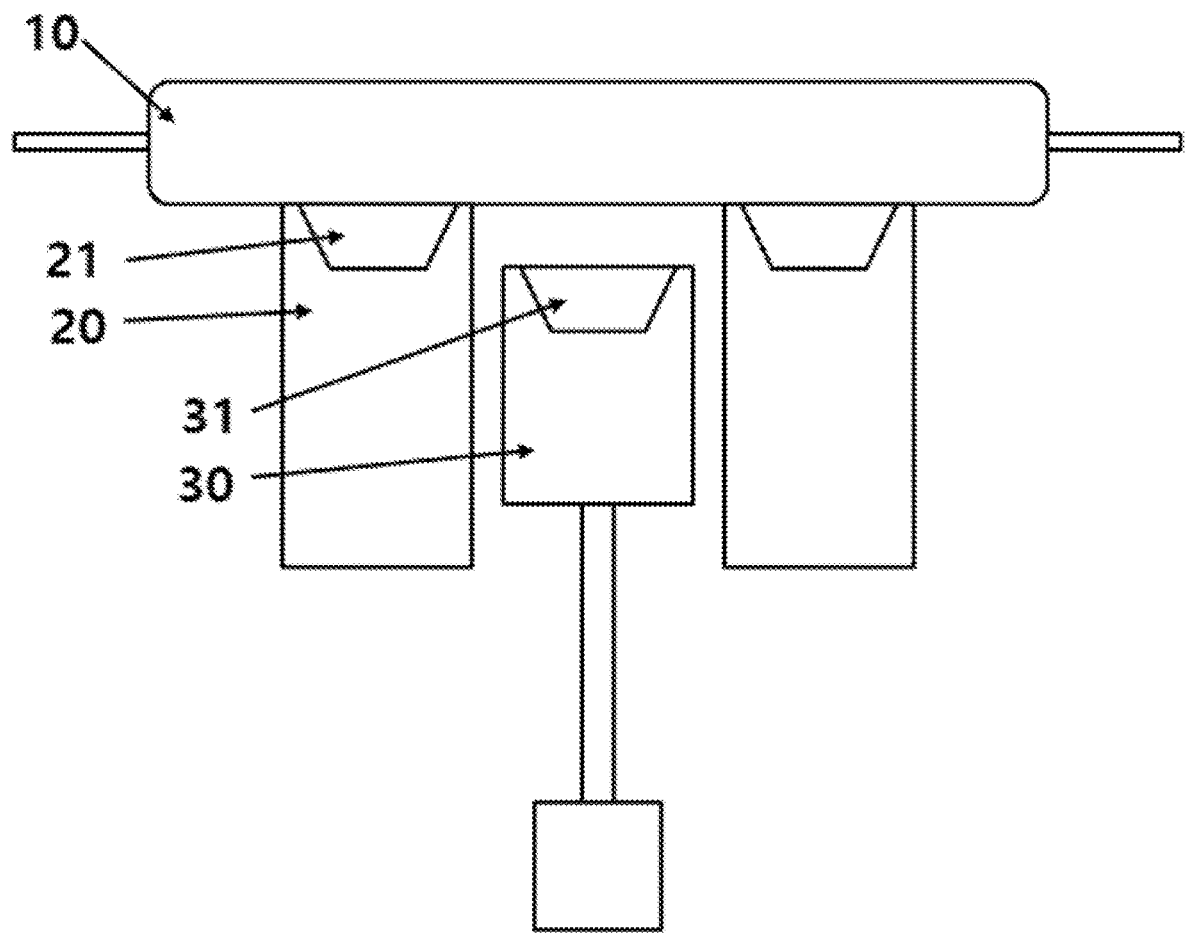
FIGS. 5 and 6 are views illustrating vacuum holding and vacuum removal of tables and a conveying bar on which the sizing roller apparatus for a folding process of a battery cell according to an embodiment of the present disclosure is placed.

FIG. 1 is a perspective view exemplarily showing a sizing roller apparatus for a folding process of a battery cell according to an embodiment of the present disclosure, FIG. 2 is a perspective view exemplarily showing a sizing roller apparatus for a folding process of a battery cell according to an embodiment of the present disclosure, and FIGS. 3 to 5 are views illustrating the sizing roller apparatus for a folding process of a battery cell according to an embodiment of the present disclosure.

Referring to FIGS. 1 to 5, a sizing roller apparatus 100 for a folding process of a battery cell according to an embodiment of the present disclosure may include a base plate 110, a plurality of sizing rollers 120, end supports 130, an air supply pipe 140, a plurality of air spray nozzles 150, etc.

First, a table 20 and a conveying bar 30 that selectively vacuum-hold a battery cell 10, which is pressed by the sizing roller apparatus 100 for a folding process of a battery cell according to an embodiment of the present disclosure, are described. The table 20 can vacuum-hold and support the battery cell 10 under the battery cell 10. The table 20 is a straight bar that is parallel with a process direction and is provided in two parallel lines to support both sides of the bottom of the battery cell 10 in a process direction.

The conveying bar 30 vacuum-holds and conveys the battery cell 10 under the battery cell 10 may be disposed between the two lines of tables 20. The conveying bar 30 can vacuum-hold and lift up the battery cell 10 and then can move straight in the process direction.

The base plate 110 is disposed on a side of the table 20, which vacuum-holds the battery cell 10 under the battery cell 10 and may be a rectangular plate having a relatively large length in parallel with the longitudinal direction of the table 20. The base plate 110 may be horizontally disposed to be able to move inward with respect to the table 20 and move in the longitudinal direction of the table 20 (i.e., in the process direction).

For example, when the battery cell 10 is conveyed by the conveying bar 30 and then seated and fixed on the table 20, the base plate 110 can horizontally move inward toward the table 20 until the inner sides of the plurality of sizing rollers 120 come in close contact with the folding portion 11 of the battery cell 10.

The plurality of sizing rollers 120 are disposed over the base plate 110 and press the folding portion 11 of the battery cell 10 in contact with the folding portion 11. The sizing rollers 120 can press the folding portion 11 of the battery cell 10 with the rotation axes inclined inward.

For example, the plurality of sizing rollers 120 may be provided such that their rotation axes are inclined inward from a vertical line at an angle within an acute angle range (e.g., 10~30 degrees). Accordingly, sizing (i.e., pressing) is possible to suppress spring back after folding and hot-pressing the battery cell 10 by pressing the battery cell 10 with the folding portion 11 of the battery cell 10 in close contact with the inner sides of the rollers.

That is, the folding portion 11 of the battery cell 10 is additionally folded within an acute angle range by the plurality of sizing rollers 120, oversizing similar to offset can be performed against spring back.

The end supports 130 are disposed at the front end and the rear end of the base plate 110, respectively, extend upward. The end supports 130 may be provided as plates bent outward in accordance with the arrangement positions of the air supply pipe 140 and the plurality of air spray nozzles 150 to be described below.

The air supply pip 140 is coupled to the tops of the end supports 130 and can supply air. The air can be sprayed through the plurality of air spray nozzles 150.

The plurality of air spray nozzles 150 communicate with the air supply pipe 140 and spray air to the spaces between the plurality of sizing rollers 120. The air spray nozzles 150 may be disposed to face inside down so that air can be sprayed to the spaces between the plurality of sizing rollers 120 from the air supply pipe 140.

Accordingly, air is sprayed to the spaces between the plurality of sizing rollers 120 in the direction of the arrow shown in FIG. 4 and the air is uniformly sprayed to the outer surfaces of the plurality of sizing rollers 120 that are rotated. Accordingly, it is possible not only to quickly decrease the temperature of all of the plurality of sizing rollers 120, but to effectively cool the folding portion 11 of the battery cell 10 because the speed of the air that have passed through the spaces between the rollers increases.

That is, the plurality of sizing rollers 120 are made of cold metal and have a permanent forming characteristic by cooling. However, the temperature of the rollers increases due to continuous sizing of battery cells 10, so not only the cooling effect decreases, but permanent forming is difficult due to reduction of the cooling effect. Accordingly, it is possible to keep the cooling effect and improve the permanent forming ability by spray air to the roller even though sizing is continuously performed.

Figure 6:
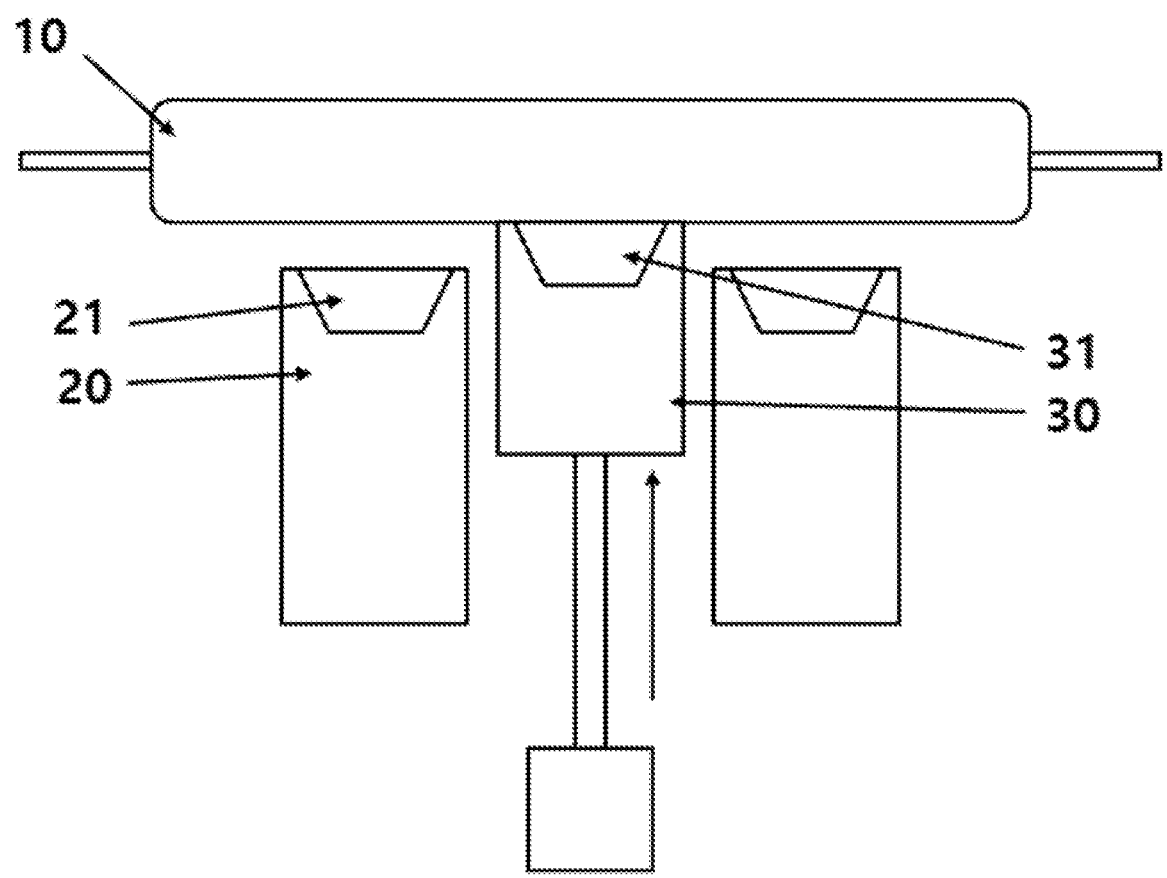

FIGS. 5 and 6 are views illustrating vacuum holding and vacuum removal of tables and a conveying bar on which the sizing roller apparatus for a folding process of a battery cell according to an embodiment of the present disclosure is placed.

Referring to FIGS. 5 and 6, the table 120, which is a straight bar parallel with the process direction, may be provided in two parallel lines in the process direction to support both sides of the bottom of the battery cell 10. The conveying bar 30 is disposed between the tables 120 and can vacuum-hold the battery cell 10 under the battery cell 10 and can move the battery cell 10.

The battery cell 10 is vacuum-held on the table 10 and may be pressed while the plurality of sizing rollers 120 are moved, or may be sized (i.e. pressed) by the plurality of sizing rollers 120 while being moved by the conveying bar 30.

For example, as shown in FIG. 5, it is possible to vacuum-hold (vacuum-suction) the battery cell 10 using vacuum pads 21 of the tables 20 and perform a pressing process using the plurality of sizing rollers 120. In this process, a vacuum pad 31 of the conveying bar 30 can be maintained in a non-vacuum state.

That is, it is possible to perform a sizing process on the folding portion 11 while moving the plurality of sizing rollers 120 in parallel with the longitudinal direction of the tables 20 (i.e., in the longitudinal direction of the folding portion 11 of the battery cell 10) with the battery cell 10 vacuum-held by the vacuum pads 21 of the tables 20.

Further, as shown in FIG. 6, it is possible to vacuum-hold (vacuum-suction) the battery cell 10 using vacuum pads 31 of the conveying bar 30 and perform a pressing process using the plurality of sizing rollers 120. In this process, the vacuum pads 21 of the tables 20 can be maintained in a non-vacuum state.

That is, the battery cell 10 is vacuum-held by the vacuum pad 31 of the conveying bar 30 by moving up the conveying bar 30 after the vacuum of the vacuum pads 21 of the table bar 20 is removed, the battery cell 10 is lifted up to the height corresponding to the plurality of sizing rollers 120, and then a sizing process can be performed on the folding portion 11 of the battery cell 10 while longitudinally moving the conveying bar 30 vacuum-holding the battery cell 10 with the folding portion 11 in contact with the plurality of sizing rollers 120.

Therefore, according to the present disclosure, it is possible to suppress spring back and improve the folding quality of a battery cell by cooling a plurality of sizing rollers in an air spray type while pressing a folding portion after a process of folding the battery cell.

Further, according to the present disclosure, when a battery cell is conveyed after a sealing region of the battery cell is folded and pressed, air is sprayed to spaces between a plurality of sizing rollers while a folding portion is pressed inward at an angle by the sizing rollers, whereby the temperature of the sizing rollers can be quickly decreased, and accordingly, the sizing effect can be remarkably improved.

Further, it is possible to reduce the number of sizing rollers, keep the speed of a folding process due to an effect of cooling sizing rollers, and considerably improve a folding quality of a battery cell by preventing spring back of the folding portion of the battery cell only by adding simple air spray nozzles after a folding and pressing step of a plurality of stations for a folding process of the battery cell.

What is claimed is:

1. A sizing roller apparatus for a folding process of a battery cell, the sizing roller apparatus comprising:
    a table fixing and supporting a battery cell;
    a base plate disposed on a side of the table;
    a plurality of sizing rollers disposed on the base plate and each having a rotation axis, which is inclined inward toward a folding portion of the battery cell, to press the folding portion of the battery cell in contact with the folding portion; and
    a plurality of air spray nozzles disposed on the base plate and spraying air to the plurality of sizing rollers.

2. The sizing roller apparatus of claim 1, wherein the base plate is horizontally disposed to be able to move inward with respect to the table and move in the longitudinal direction of the table.

3. The sizing roller apparatus of claim 1, wherein the plurality of air spray nozzles spray air to spaces between the plurality of sizing rollers.

4. The sizing roller apparatus of claim 1, wherein the table has:
    a straight bar disposed in parallel with a process direction, vacuum-holding and supporting both sides of the bottom of the battery cell in the process direction, and arranged in two lines; and
    a conveying bar disposed between the straight bars, vacuum-holding the battery cell under the battery cell, and conveying the battery cell.

5. The sizing roller apparatus of claim 1, wherein the battery cell is fixed and held on the table and pressed while the plurality of sizing rollers is moved.

6. The sizing roller apparatus of claim 4, wherein the battery cell is pressed by the plurality of sizing rollers while being moved by the conveying bar.

7. The sizing roller apparatus of claim 1, comprising:
end supports disposed at the front end and the rear end of the base plate, respectively, in the longitudinal direction of the table, extending upward; and
an air supply pipe coupled to the tops of the end supports to supply air,
wherein the plurality of air spray nozzles communicates with the air supply pipe and spray the air to the plurality of sizing rollers.

\* \* \* \* \*